United States Patent
Ueno et al.

(10) Patent No.: US 10,697,397 B2
(45) Date of Patent: Jun. 30, 2020

(54) COMBUSTOR, JET ENGINE, FLYING BODY, AND OPERATION METHOD OF JET ENGINE

(71) Applicant: MITSUBISHI HEAVY INDUSTRIES, LTD., Tokyo (JP)

(72) Inventors: Yoshihiko Ueno, Tokyo (JP); Oto Yamamoto, Tokyo (JP); Tasuku Suzuki, Tokyo (JP); Shojiro Furuya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 331 days.

(21) Appl. No.: 15/121,172

(22) PCT Filed: Feb. 13, 2015

(86) PCT No.: PCT/JP2015/054027
§ 371 (c)(1),
(2) Date: Aug. 24, 2016

(87) PCT Pub. No.: WO2015/146357
PCT Pub. Date: Oct. 1, 2015

(65) Prior Publication Data
US 2017/0030297 A1    Feb. 2, 2017

(30) Foreign Application Priority Data

Mar. 26, 2014   (JP) ................................. 2014-064123

(51) Int. Cl.
*F02K 7/00*     (2006.01)
*F02K 7/10*     (2006.01)
(Continued)

(52) U.S. Cl.
CPC ................ *F02K 7/10* (2013.01); *F02C 7/264* (2013.01); *F02K 9/32* (2013.01); *F02K 9/78* (2013.01);
(Continued)

(58) Field of Classification Search
CPC ..... F02K 7/10; F02K 7/18; F02K 7/14; F02K 7/16; F02K 7/105; F02K 9/32; F02K 9/78;
(Continued)

(56) References Cited

U.S. PATENT DOCUMENTS 2,989,922 A * 6/1961 Greenwood .............. F02K 7/18
102/380
3,667,233 A    6/1972 Curran et al.
(Continued)

FOREIGN PATENT DOCUMENTS

GB    2 274 881    8/1994
JP    2-275051    11/1990
(Continued)

OTHER PUBLICATIONS

International Search Report dated May 19, 2015 in related International Application No. PCT/JP2015/054025.
(Continued)

*Primary Examiner* — Todd E Manahan
*Assistant Examiner* — Edwin Kang
(74) *Attorney, Agent, or Firm* — Wenderoth, Lind & Ponack, L.L.P.

(57) ABSTRACT

A combustor of a jet engine includes a fuel injector, an igniter for igniting a gas mixture of air and fuel, and a flame holder. The igniter is disposed in the flame holder. After an activation of the igniter, the igniter disappears, and a space after the disappearance functions as a flame-holding space.

9 Claims, 8 Drawing Sheets

(51) Int. Cl.
*F02C 7/264* (2006.01)
*F02K 9/95* (2006.01)
*F02K 9/32* (2006.01)
*F02K 9/78* (2006.01)

(52) U.S. Cl.
CPC ............ *F02K 9/95* (2013.01); *F05D 2220/80* (2013.01); *F05D 2240/35* (2013.01); *F05D 2260/85* (2013.01)

(58) Field of Classification Search
CPC ...... F02K 9/95; F23R 3/18; F23R 3/24; F05D 2220/80; F05D 2260/99; F05D 2240/35
See application file for complete search history.

(56) References Cited

U.S. PATENT DOCUMENTS

| | | | |
|---|---|---|---|
| 3,942,320 A | 3/1976 | Ortwerth et al. | |
| 4,441,312 A | 4/1984 | Smith | |
| 5,010,728 A * | 4/1991 | Joy | F02C 3/26 60/253 |
| 5,072,582 A | 12/1991 | Harshman | |
| 5,223,651 A | 6/1993 | Stickler et al. | |
| 5,660,357 A | 8/1997 | Grossman et al. | |
| 5,857,339 A * | 1/1999 | Roquemore | F23R 3/20 431/116 |
| 6,293,091 B1 * | 9/2001 | Seymour | F02K 1/008 60/225 |
| 8,256,203 B1 * | 9/2012 | Blackmon | F02K 1/004 60/224 |
| 2003/0136110 A1 | 7/2003 | Kline et al. | |
| 2004/0000134 A1 | 1/2004 | Tew et al. | |
| 2004/0144886 A1 * | 7/2004 | Le Helley | F02K 9/26 244/3.1 |
| 2007/0044449 A1 | 3/2007 | O'Brien et al. | |
| 2009/0205311 A1 | 8/2009 | Bulman et al. | |
| 2011/0203256 A1 * | 8/2011 | Chen | F02K 9/28 60/251 |
| 2011/0314791 A1 * | 12/2011 | Haynes | C23C 24/04 60/253 |
| 2013/0087109 A1 | 4/2013 | Naitoh | |
| 2013/0118147 A1 | 5/2013 | Mihara et al. | |

FOREIGN PATENT DOCUMENTS

| | | |
|---|---|---|
| JP | 5-180078 | 7/1993 |
| JP | 6-60597 | 8/1994 |
| JP | 6-241119 | 8/1994 |
| JP | 3032377 | 4/2000 |
| JP | 2011-508126 | 3/2011 |
| JP | 2012-13007 | 1/2012 |
| JP | 2012-13008 | 1/2012 |
| JP | 2012-207555 | 10/2012 |
| JP | 2012-207610 | 10/2012 |
| WO | 2011/155248 | 12/2011 |

OTHER PUBLICATIONS

International Search Report dated May 19, 2015 in corresponding International Application No. PCT/JP2015/054027.
Office Action dated Dec. 6, 2017 in corresponding Japanese Application No. 2014-064200, with English translation.
Extended European Search Report dated Feb. 10, 2017 in corresponding European Application No. 15768446.5.
Extended European Search Report dated Feb. 15, 2017 in corresponding European Application No. 15767934.1.
International Preliminary Report on Patentability dated Sep. 27, 2016 in corresponding International Application No. PCT/JP2015/054027.
Office Action dated Feb. 21, 2019 in U.S Appl. No. 15/120,859.
Office Action dated Mar. 20, 2020 in U.S. Appl. No. 15/120,859.

* cited by examiner

Fig. 1

PRIOR ART

Fig. 2

PRIOR ART

COMBUSTOR, JET ENGINE, FLYING BODY, AND OPERATION METHOD OF JET ENGINE

CROSS-REFERENCE TO RELATED APPLICATION

This application claims priority based on Japanese Patent Application No. JP 2014-64123 filed on Mar. 26, 2014, the disclosure of which is hereby incorporated by reference herein in its entirety.

TECHNICAL FIELD

The present invention relates to a combustor, a jet engine, a flying body, and an operation method of a jet engine.

BACKGROUND ART

As a jet engine of a flying body to be flying faster than a speed of sound, a turbojet engine (including a turbofan engine etc.), a ramjet engine and a scramjet engine are known. These are jet engines, and in particular in the ramjet engine and the scramjet engine, a speed of air taken therein depends strongly on a flight speed.

Figure 1:
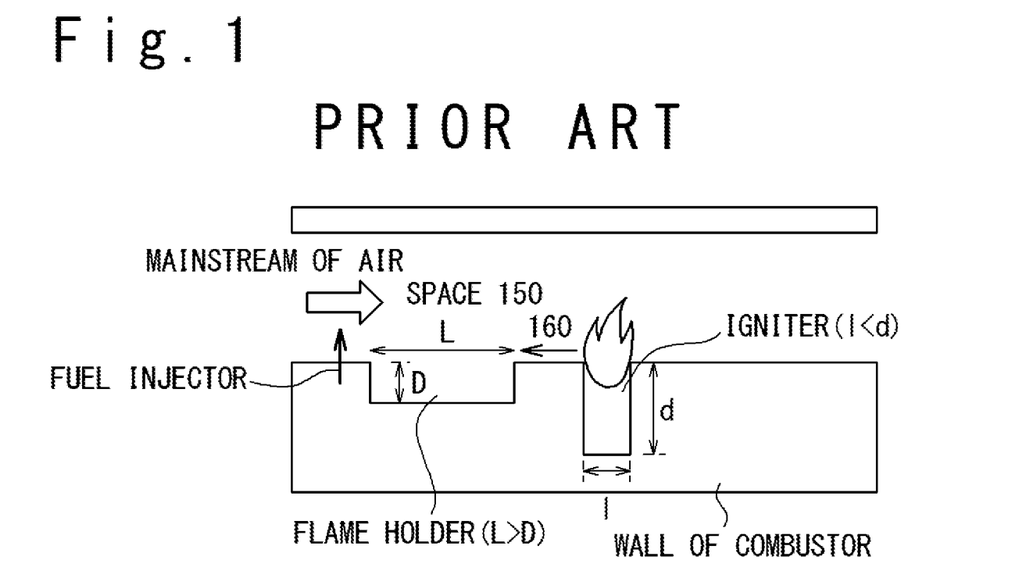
FIG. 1 is the schematic cross-sectional view schematically indicating the configuration of the conventional jet engine, and indicating the state at time of starting the igniter.
Figure 2:
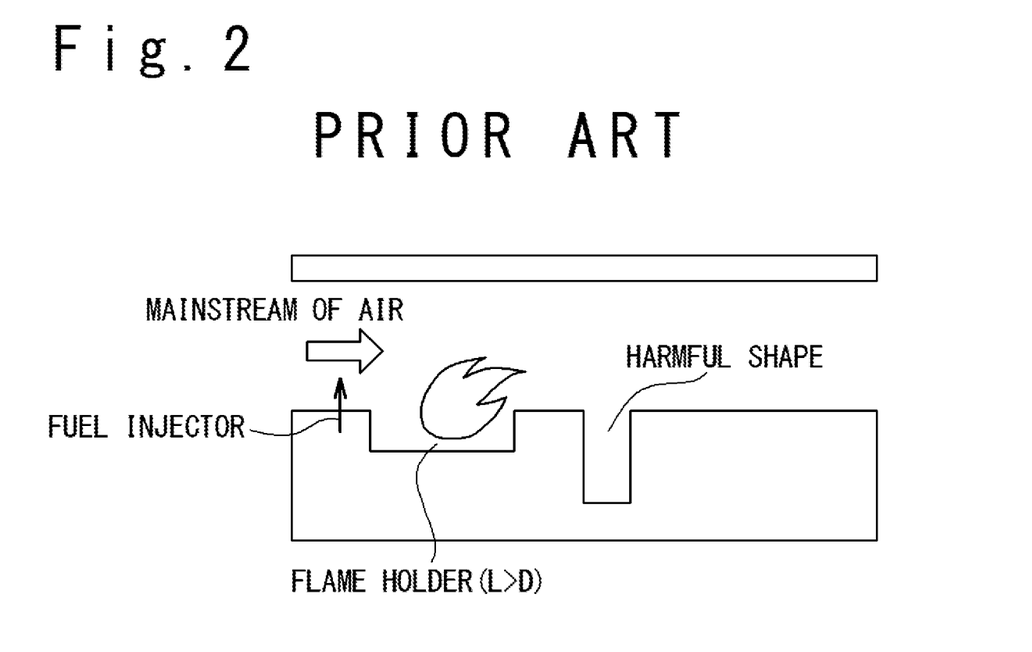
FIG. 2 is the schematic cross-sectional view schematically indicating the configuration of the conventional jet engine, and indicating the state after the igniter has been activated and at time of keeping the flame.

FIG. 1 and FIG. 2 are schematic cross-sectional views schematically indicating a configuration of a jet engine combustor. The combustor includes a fuel injector and an igniter. The fuel injector is formed in a wall of the combustor. The fuel injector injects fuel toward a space 150. The igniter emits flame toward a space 150 (FIG. 1). The flame generated by the igniter ignites a gas mixture of a mainstream of air and the fuel. Flame generated by the ignition of the gas mixture propagates to a flame holder, and the flame is kept in the flame holder. The flame kept in the flame holder burns the gas mixture of the mainstream of air and the fuel (FIG. 2). Then, combustion gas is discharged from a nozzle arranged rearward of the combustor, and the jet engine obtains thrust.

As a method for igniting the gas mixture, a method of installing a small type solid rocket motor igniter in a deep recess etc. formed in a wall surface of the combustor and igniting the gas mixture using the flame generated by the igniter is known (FIG. 1). In igniting, for vigorously emitting the flame generated by the igniter toward the space as well as for increasing a filling ratio of the solid fuel, a shape having deep configuration is adopted as a shape of the recess for installing the igniter. In general, when a maximum length of the recess along a direction of the mainstream of the air is defined as a length l, and a maximum depth of the recess is defined as a depth d, the length l and the depth d are set such that l<d is satisfied.

The flame generated by the igniter propagates along a direction indicated by an arrow 160 by burning the gas mixture. Then, the propagated flame is kept in the flame holder.

As a flame holding mechanism, a method of forming a low speed region of the gas mixture using a shallow depression etc. formed in the wall surface of the combustor and keeping the flame using the low speed region is known (FIG. 2). In general, when a maximum length of the depression along the direction of the mainstream of the air is defined as a length L, and a maximum depth of the depression is defined as a depth D, the length L and the depth D are set such that L>D is satisfied.

As a related technology, in Japanese Patent Literature JP H06-060597 B2, a method of igniting for a combustor and keeping flame is disclosed.

CITATION LIST

Patent Literature

Patent Literature 1: JP H06-060597 B2

SUMMARY OF THE INVENTION

An object of the present invention is to provide a combustor, a jet engine, a flying body, and an operation method of a jet engine which contribute to improve engine performance and simplify engine design by using a cavity generated by disappearance of an igniter after activation of the igniter as a flame holder (a flame-holding space). In addition, an optional object of the present invention is to provide the combustor, the jet engine, the flying body, and the operation method of the jet engine which contribute to stabilize the ignition as well as flame keeping and reduce size of the igniter by making it unnecessary to propagate flame from the ignition to the flame keeping.

A combustor according to some embodiments is a combustor for burning fuel using air taken through an inlet. The combustor includes an injector for injecting the fuel, a flame holder formed in a wall surface of the combustor, and an igniter for igniting a gas mixture of the air and the fuel. The flame holder keeps flame for burning the fuel injected from the injector. The igniter is disposed in the flame holder and able to disappear to form a flame-holding space in the flame holder.

An operation method of a jet engine according to some embodiments is an operation method of a jet engine which includes an inlet for taking air, a combustor for generating combustion gas by burning fuel using the air, and a nozzle for ejecting the combustion gas from a rearward side of the jet engine. The combustor includes an injector for injecting the fuel, a flame holder formed in a wall surface of the combustor, and an igniter disposed in the flame holder. The flame holder keeps flame for burning the fuel injected from the injector. The igniter is disposed in the flame holder and able to disappear to form a flame-holding space in the flame holder. The operation method includes a step of taking the air through the inlet, a step of igniting the gas mixture of the air and the fuel using the igniter, a step of keeping the flame for burning the fuel using a flame-holding space formed by disappearance of the igniter after the igniter is activated, a step of burning the gas mixture of the air and the fuel using the kept flame, and a step of emitting combustion gas generated by the burning from the nozzle.

According to the present invention, the combustor, the jet engine, the flying body, and the operation method of the jet engine which contribute to improve the engine performance and simplify the engine design, and optionally contribute to stabilize the ignition as well as the flame keeping and reduce the size of the igniter are provided.

BRIEF DESCRIPTION OF THE DRAWINGS

The accompanying drawings are incorporated into the specification to assist in explaining some embodiments. The drawings are not to be construed as limiting the inventions to only those examples illustrated and described.

DESCRIPTION OF EMBODIMENTS

Hereinafter, a combustor, a jet engine, a flying body, and an operation method of a jet engine according to some embodiments will be explained with reference to the accompanying drawings. Here, an example in which the jet engine is applied to the flying body will be explained. In the following detailed description, for purpose of explanation, numerous specific details are set forth in order to provide a thorough understanding of the disclosed embodiments. It will be apparent, however, that one or more embodiments may be practiced without these specific details.

Figure 3:
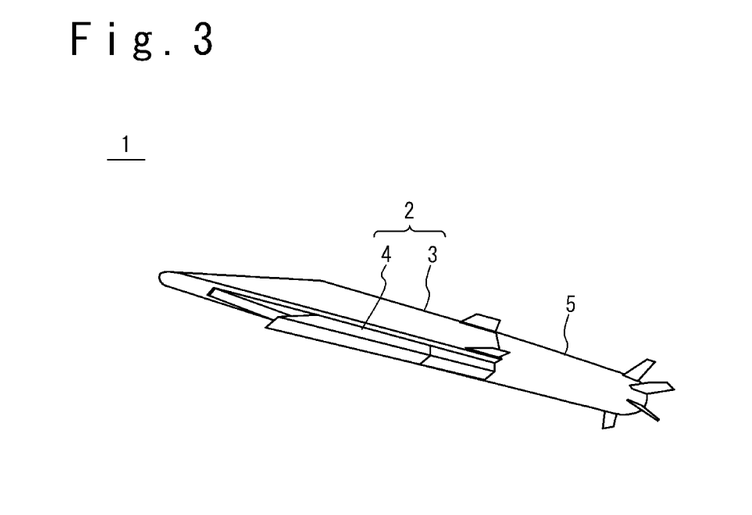
FIG. 3 is a perspective view indicating an example of a configuration of a flying body according to some embodiments.

A configuration of the flying body 1 according to some embodiments will be explained. FIG. 3 is the perspective view indicating the example of the configuration of the flying body 1 according to some embodiments. The flying body 1 includes a jet engine 2 and a propulsion device 5. The propulsion device 5 accelerates the flying body 1 from a speed at time of a flight start to a desired speed when the flying body 1 is launched from a launching unit. Note that the speed at the time of the flight start is zero in a case in which the flying body 1 is launched from the launching unit which is not moving. On the other hand, the speed at the time of the flight start is equal to a moving speed (or a flight speed) of a moving object (or a flying object) in a case in which the flying body is launched from the launching unit of the moving object (or the flying object) which is presently moving (or flying). As a specific example of the propulsion device 5, a rocket motor can be exemplified. However, the propulsion device 5 may be any type of device as long as it can accelerate the flying body to the desired speed. For example, in a case in which the flying body 1 is mounted on a second flying body different from the flying body 1 and is accelerated to the desired speed, the second flying body is the propulsion device 5.

The jet engine 2 further accelerates the flying body 1 and make the flying body 1 fly toward a target after the propulsion device 5 is separated from the flying body 1. The jet engine 2 includes an airframe 3 and a cowl 4. As will be described later, the airframe 3 and the cowl 4 constitute an inlet, a combustor and a nozzle of the jet engine 2. The jet engine 2 takes in air from a front side using the inlet, mixes the air and fuel and burns the fuel in the combustor, and expands combustion gas in the nozzle and exhausts it rearwardly. Thus, the jet engine 2 can obtain thrust. Note that, in FIG. 3, the jet engine 2 is constituted by a lower portion of the airframe 3 and the cowl 4. However, the jet engine 2 may be constituted by a tubular body which is disposed under or in the airframe 3. In this case, a front side part of the tubular body constitutes the inlet, an intermediate part of the tubular body constitutes the combustor, and a rear side part of the tubular body constitutes the nozzle.

Figure 4:
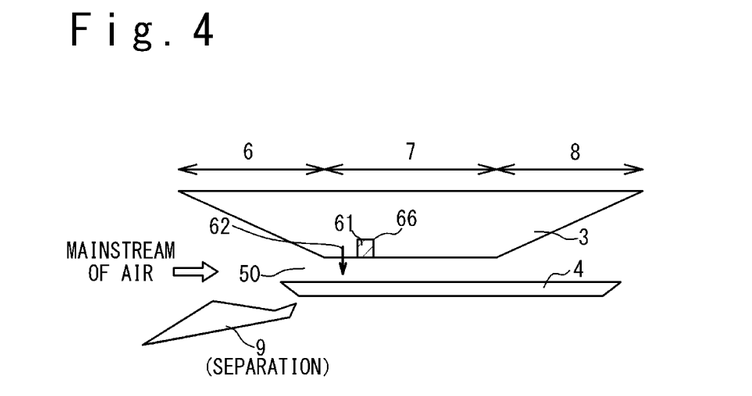
FIG. 4 is a schematic cross-sectional view schematically indicating a configuration of a jet engine according to some embodiments.

FIG. 4 is the schematic cross-sectional view schematically indicating the configuration of the jet engine according to some embodiments. The jet engine 2 includes the airframe 3, and the cowl 4 which is provided so as to form a space 50, through which gas can flow, below the airframe 3. A lower portion of a front side part of the airframe 3 and a front side part of the cowl 4 constitute the inlet 6 for introducing the air into the space 50. Further, in front of the inlet 6, an inlet cover 9 is provided so as to be separable from the inlet 6. The inlet cover 9 is mounted on a forward side of the inlet 6 before the engine starts. Thus, the inlet cover 9 is used for reducing aerodynamic resistance of the airframe and preventing a foreign object from entering the engine until time of starting the engine. A lower portion of an intermediate part of the airframe 3 and an intermediate part of the cowl 4 constitute a combustor 7 for mixing the fuel and the air and burning a gas mixture. A lower portion of a rear side part of the airframe 3 and a rear side part of the cowl 4 constitute nozzle 8 for expanding and emitting the combustion gas.

The combustor 7 includes an igniter 61, a fuel injector 62, and a flame-holding depression 66.

Hereinafter, some embodiments will be described in detail.

First Embodiment

Figure 5:
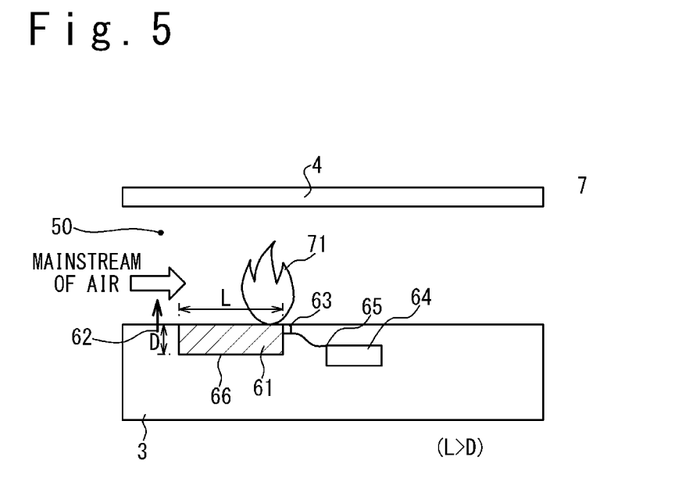
FIG. 5 is a schematic cross-sectional view schematically indicating a configuration of a combustor of the jet engine according to the first embodiment, and indicating a state at time of starting the igniter.
Figure 6:
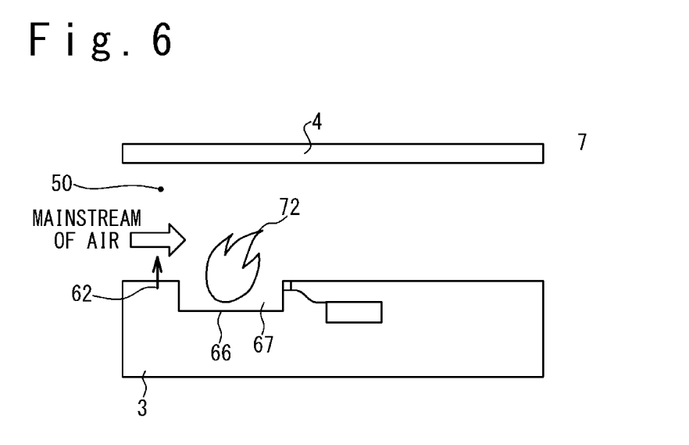
FIG. 6 is a schematic cross-sectional view schematically indicating the configuration of the combustor of the jet engine according to the first embodiment, and indicating a state after the igniter has been activated and at time of keeping the flame.

Hereinafter, with reference to FIG. 5 and FIG. 6, the combustor of the jet engine according to the first embodiment will be explained. FIG. 5 is the schematic cross-sectional view schematically indicating the configuration of the combustor of the jet engine according to the first embodiment, and indicating the state at time of starting the igniter. FIG. 6 is the schematic cross-sectional view schematically indicating the configuration of the combustor of the jet engine according to the first embodiment, and indicating the state after the igniter has been activated and at time of keeping the flame.

FIG. 5 and FIG. 6 are enlarged views of a portion of the combustor 7 shown in FIG. 4. Note that FIG. 5 and FIG. 6 are described upside down with respect to FIG. 4. That is, an upper side in FIG. 4 corresponds to a lower side in FIG. 5 and FIG. 6, and a lower side in FIG. 4 corresponds to an upper side in FIG. 5 and FIG. 6. Hereinafter, for convenience, the upper side in FIG. 5 and FIG. 6 is referred to as an upper side, the lower side in FIG. 5 and FIG. 6 is referred to as a lower side, a left side in FIG. 5 and FIG. 6 (namely an upstream side of a mainstream of air) is referred to as an upstream side, and a right side in FIG. 5 and FIG. 6 (namely a downstream side of the mainstream of air) is referred to as a downstream side.

The combustor 7 includes the igniter 61, the fuel injector 62, and the flame-holding depression 66. The fuel injector 62 is formed in a wall of the airframe 3 and in the wall of the combustor 7. The fuel injector 62 injects the fuel stored in the airframe 3 toward the space 50. The igniter 61 is, for example, a solid rocket motor (solid RM). In the present specification, the solid rocket motor is defined as a device that emits the flame by burning a solid fuel. As a material of the solid rocket motor, for example, (1) nitrocellulose plus nitroglycerin (flame temperature: from 1700 degrees Celsius to 3150 degrees Celsius, burning rate: from 0.6 cm/s to 2.3 cm/s), (2) AN/$C_2H_4O$ (flame temperature: 1800 degrees Celsius, burning rate: from 0.1 cm/s to 0.4 cm/s), (3) AP/$C_2H_4O$/Al (flame temperature: from 2800 degrees Celsius to 3600 degrees Celsius, burning rate: from 0.8 cm/s to 1.4 cm/s) etc. are exemplified. The igniter 61 emits the flame 71 toward the space 50. The igniter 61 starts by electrical energy, thermal energy or the like generated by an igniter driver 63. Further, the igniter driver 63 starts in response to an activation signal etc. transmitted from an igniter controller 64 via a cable 65 etc.

Here, further explanation about the igniter 61 will be made. The igniter 61 is disposed in a flame holder formed in a wall surface of the combustor 7, for example, in the flame-holding depression 66. The igniter 61 disappears by activation of the igniter. For example, when the solid rocket motor is adopted as the igniter 61, the rocket motor disappears by burning the solid fuel which constitutes the solid rocket motor. Thus, as shown in FIG. 6, a space formed by the disappearance functions as a flame-holding space 67.

In addition, the igniter 61 is activated to emit the flame 71 toward the space 50. The gas mixture of the mainstream of the air and the fuel from the fuel injector 62 burns using the flame 71 and flame 72 is formed. The flame 72 is also formed in the space generated by the disappearance of the igniter 61. Since the space, i.e., the flame-holding space 67 is a region where a low-speed gas mixture flow exists, the flame 72 formed in the space, i.e., the flame-holding space 67 is kept.

Figure 7:
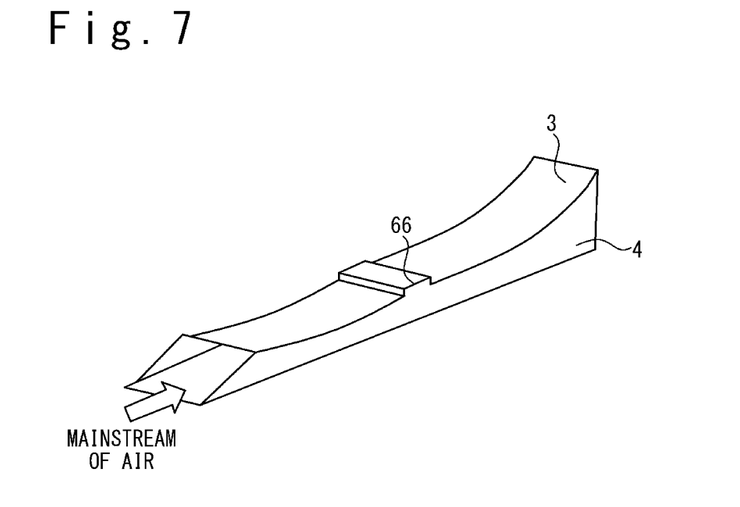
FIG. 7 is a perspective view indicating an example of a position and shape of a frame-holding depression 66. Note that, regarding an airframe 3, only a part of lower wall, which constitutes a passage of a mainstream of air, is illustrated in FIG. 7.

Then, with reference to FIGS. 5 to 7, a shape of the flame-holding depression 66 will be explained. FIG. 7 is the perspective view indicating the example of the position and shape of the frame-holding depression 66. Note that, regarding the airframe 3, only a part of the lower wall, which constitutes the passage of the mainstream of the air, is illustrated in FIG. 7. In FIG. 7, the flame-holding depression 66 is provided over the entire width of the combustor along a span direction (lateral direction) of the jet engine. In addition, the flame-holding depression 66 is a rectangular-parallelepiped-shaped depression. However, the shape of the flame-holding depression 66 may be other shapes. Further, the flame-holding depression 66 may be provided over a portion of the width of the combustor 7. When the flame-holding depression 66 is provided over a portion of the width of the combustor 7, a plurality of the frame-holding depressions 66 may be provided along the span direction. Note that, from the viewpoint of aerodynamics and stable flame-holding, it is preferable that the flame-holding depression 66 is a shallow depression. For example, when a maximum length of the flame-holding depression 66 along the direction of the mainstream of the air is defined as a length L, and a maximum depth of the flame-holding depression 66 is defined as a depth D, it is preferable that the length L and the depth D are set such that L>D is satisfied. It is more preferable that the length L and the depth D are set such that 10D>L>2D is satisfied.

Subsequently, an operation method of the flying body 1 and the jet engine 2 according to the present embodiment will be explained.

Firstly, the inlet cover 9 is separated from the inlet 6, after the flying body reaches the desired speed. Then, the high speed air flows into the space 50, and the mainstream of the air is formed. Next, the fuel is injected from the fuel injector 62 toward the mainstream of the air, i.e., toward the space 50. The mainstream of the air and the fuel are mixed, and the gas mixture flow is formed. Further, before or after the time of the fuel injection, the activation signal from the igniter controller 64 is transmitted to the igniter driver 63 via the cable 65 or the like. The igniter driver 63 starts the igniter 61. The igniter 61 is activated to emit the flame 71 toward the space 50. The flame 71 is used to burn the gas mixture of the gas mixture flow, and the flame 72 is formed. In addition, the igniter 61 disappears by the activation, and a space after the disappearance is formed. Then, the space after the disappearance functions as the flame-holding space 67 for the flame 72. The kept flame in the flame-holding space 67 is used to continuously burn the gas mixture of the gas mixture flow. The combustion gas generated by the combustion is discharged from the nozzle 8. By discharging the combustion gas, the flying body 1 obtains thrust and flies.

In a typical jet engine, there is a case in which a recess for installation of the igniter and a recess for the flame holder are separately provided. In such a jet engine, a space for the installation of the igniter and a space for the installation of the flame holder are separately secured. In contrast, in the combustor 7 according to some embodiments, the space after the disappearance of the igniter 61 is used as the flame-holding space 67. Therefore, it may not be required to secure the installation space for the igniter 61 independently.

Further, regarding the jet engine in which the recess for installation of the igniter and the recess for the flame holder are separately provided, it is necessary that the gas mixture having suitable air/fuel ratio for combustion is delivered to both the vicinity of the recess for installation of the igniter and the vicinity of the recess for the flame holder. Therefore, the engine design is relatively complicated. In contrast, in the combustor 7 according to some embodiments, if the design is made such that the gas mixture having suitable air/fuel ratio for combustion is delivered to the flame-holding depression 66, the gas mixture having suitable air/fuel ratio for combustion is also delivered to the igniter 61 and the flame-holding space 67 located in the flame-holding depression 66. Therefore, the engine design is simplified.

Further, regarding the jet engine in which the recess for installation of the igniter and the recess for the flame holder are separately provided, it is necessary that the flame generated by the igniter is propagated to the recess for the flame holder. In contrast, in the combustor 7 according to some embodiments, it is not necessary that the flame generated by the igniter is propagated to the recess for the flame holder. Therefore, the ignition and flame keeping are not destabilized.

Further, regarding the jet engine in which the recess for installation of the igniter and the recess for the flame holder are separately provided, it is necessary to take measures such that the flame is not disappeared when the flame generated by the igniter is propagated to the recess for the flame holder. Therefore, it is necessary to make an igniter output relatively larger. As a result, the igniter becomes large-sized. In contrast, in the combustor 7 according to some embodiments, it is not necessary that the flame generated by the igniter is propagated to the recess for the flame holder. Therefore, it is possible to make the igniter output relatively smaller. As a result, it is possible to install the igniter in the flame-holding depression that is the shallow depression while defying common general technical knowledge that, conventionally, a shape having deep configuration is adopted as a shape of the recess for installing the igniter so as to vigorously emit the flame generated by the igniter toward the space and increase a filling ratio of the solid fuel.

In addition, regarding the jet engine in which the recess for installation of the igniter and the recess for the flame holder are separately provided, there is a case in which a cavity generated by the disappearance of the igniter (recess where the igniter had been installed) after the activation of the igniter forms a harmful shape from the viewpoint of aerodynamics. For example, by the presence of the cavity, disturbances are generated in the fluid flow or shock waves are generated. As a result, engine performance is reduced. In contrast, in the combustor 7 according to some embodiments, a cavity generated by the disappearance of the igniter 61 (the depression where the igniter had been installed) after the activation of the igniter does not form a harmful shape, but used as the flame-holding space 67.

Alternative Example of the First Embodiment

Figure 8:
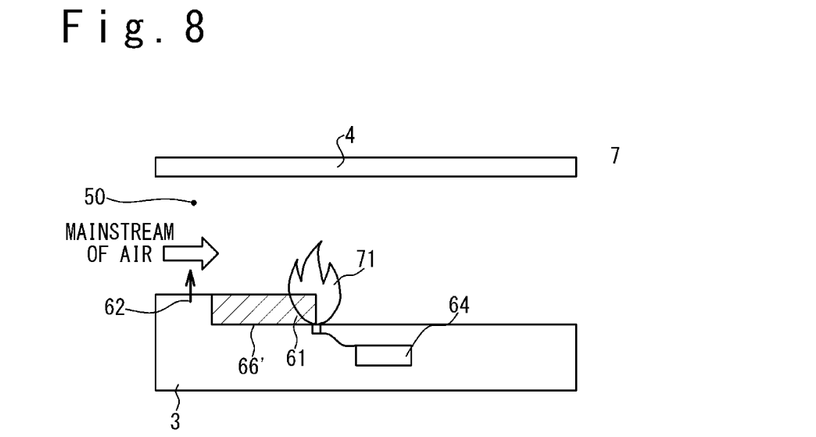
FIG. 8 is a schematic cross-sectional view schematically indicating a configuration of the combustor of the jet engine according to an alternative example of the first embodiment, and indicating the state at time of starting the igniter.
Figure 9:
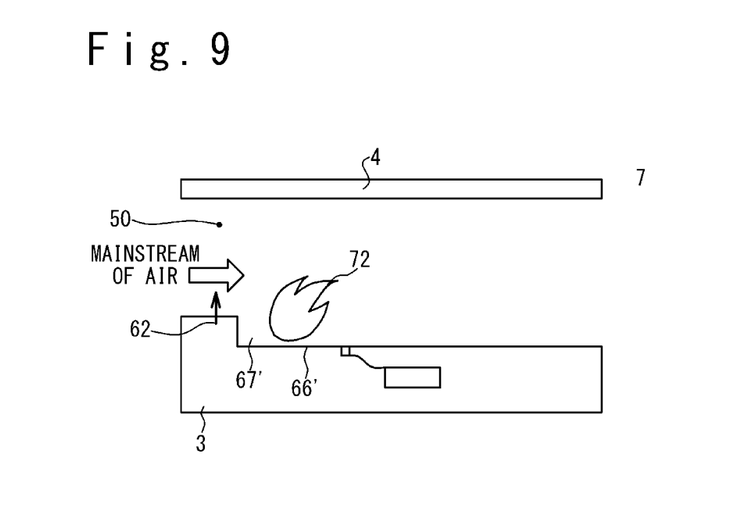
FIG. 9 is a schematic cross-sectional view schematically indicating a configuration of the combustor of the jet engine according to the alternative example of the first embodiment, and indicating the state after the igniter has been activated and at time of keeping the flame.

In the first embodiment, the flame holder is the flame-holding depression 66. However, it is also possible that a flame-holding step portion 66' (that is a retracted portion retracted from the wall surface of the upstream side of the combustor in a lowering direction i.e. a direction away from the mainstream of the air) is used as the flame holder as shown in FIG. 8 and FIG. 9. In this case, the igniter 61 is installed on the flame-holding step portion 66'. Then, the space formed after the disappearance of the igniter 61 becomes the flame-holding space 67'.

The alternative example of the first embodiment has the same effects as the first embodiment.

Second Embodiment

Figure 10:
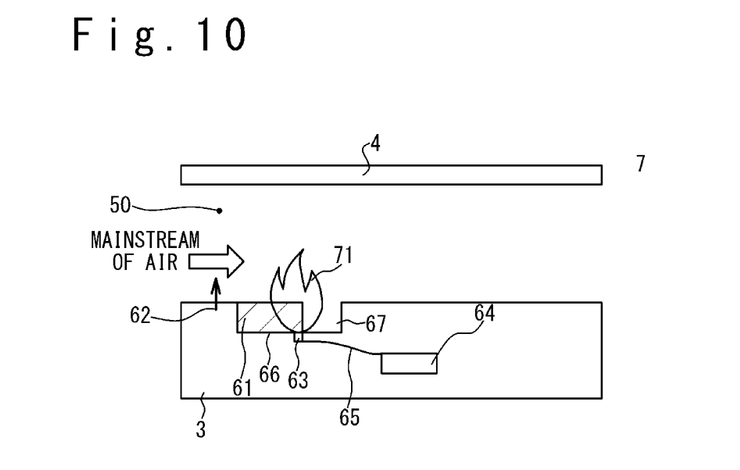
FIG. 10 is a schematic cross-sectional view schematically indicating a configuration of the combustor of the jet engine according to the second embodiment, and indicating the state at time of starting the igniter and keeping the flame.
Figure 11:
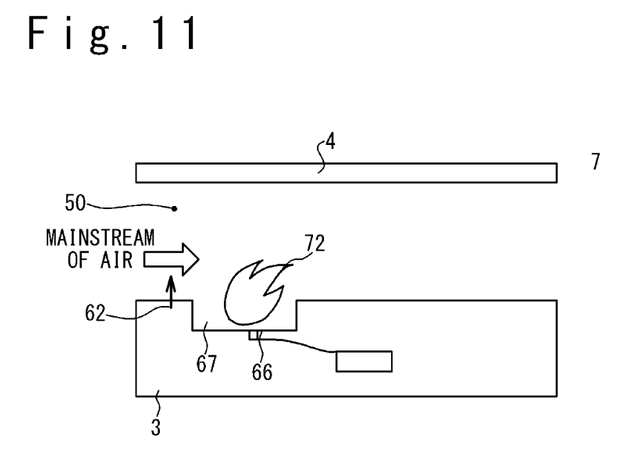
FIG. 11 is a schematic cross-sectional view schematically indicating a configuration of the combustor of the jet engine according to the second embodiment, and indicating the state after the igniter has been activated and at time of keeping the flame.

Hereinafter, with reference to FIG. 10 and FIG. 11, the combustor of the jet engine according to the second embodiment will be explained. FIG. 10 is the schematic cross-sectional view schematically indicating the configuration of the combustor of the jet engine according to the second embodiment, and indicating the state at time of starting the igniter and keeping the flame. FIG. 11 is the schematic cross-sectional view schematically indicating the configuration of the combustor of the jet engine according to the second embodiment, and indicating the state after the igniter has been activated and at time of keeping the flame.

In the second embodiment, for the same components as those of the first embodiment, the same reference numerals are used. The second embodiment differs from the first embodiment in points in which the igniter 61 is installed only in a part of the frame-holding depression 66, and a part where the igniter 61 is not installed functions as the flame-holding space 67.

Subsequently, the operation method of the flying body 1 and the jet engine 2 according to the present embodiment will be explained.

Firstly, the inlet cover 9 is separated from the inlet 6, after the flying body reaches the desired speed. Then, the high speed air flows into the space 50, and the mainstream of the air is formed. Next, the fuel is injected from the fuel injector 62 toward the mainstream of the air, i.e., toward the space 50. The mainstream of the air and the fuel are mixed, and the gas mixture flow is formed. Further, before or after the time of the fuel injection, the activation signal from the igniter controller 64 is transmitted to the igniter driver 63 via the cable 65 or the like. The igniter driver 63 starts the igniter 61. The igniter 61 is activated to emit the flame 71 toward the space 50. In a state immediately after the start of the igniter 61, a part of the flame-holding depression 66 where the igniter 61 has not been installed functions as the flame-holding space 67 for the flame 71. The flame 71 is used to burn the gas mixture of the gas mixture flow, and the flame 72 is formed. In addition, the igniter 61 disappears by the activation, and a space after the disappearance is formed. Then, the space after the disappearance in addition to a part of the flame-holding depression 66 where the igniter 61 has not been installed functions as the flame-holding space 67 for the flame 72. The kept flame in the flame-holding space 67 is used to continuously burn the gas mixture of the gas mixture flow. The combustion gas generated by the combustion is discharged from the nozzle 8. By discharging the combustion gas, the flying body 1 obtains thrust and flies.

The present embodiment has the same effects as the first embodiment. In addition, the present embodiment has the following effect. That is, in a state immediately after the start of the igniter 61, a part of the flame-holding depression 66 where the igniter has not been installed functions as the flame-holding space 67 for the flame 71. Thus, even when flame power is weak, the flame 71 is securely kept.

Third Embodiment

Figure 12:
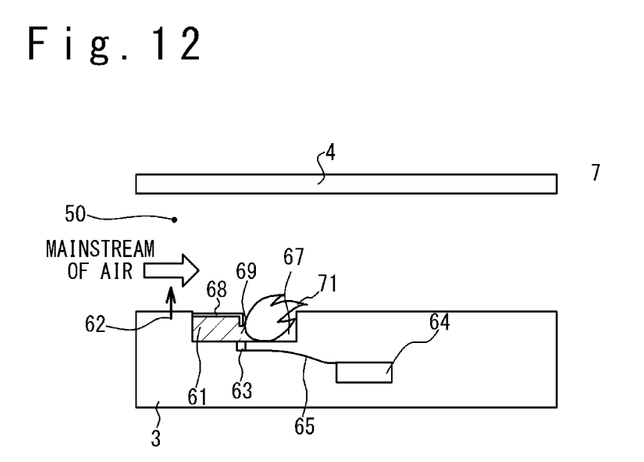
FIG. 12 is a schematic cross-sectional view schematically indicating a configuration of the combustor of the jet engine according to the third embodiment, and indicating the state at time of starting the igniter and keeping the flame.
Figure 13:
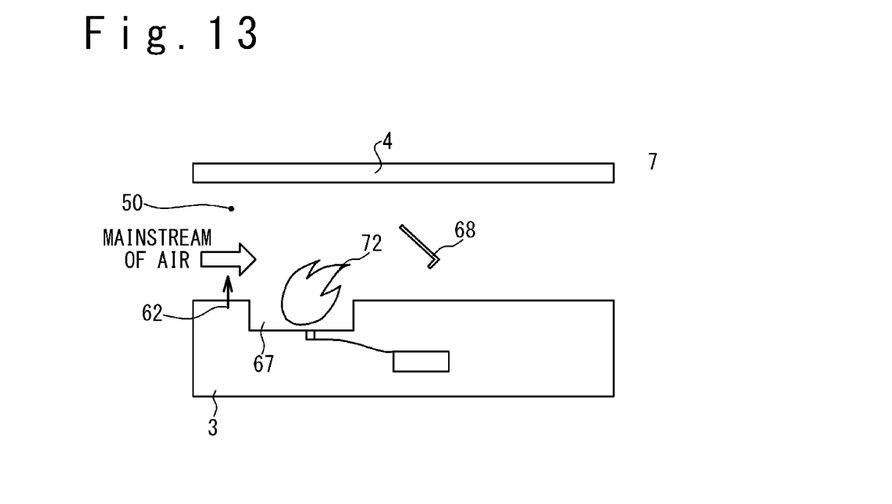
FIG. 13 is a schematic cross-sectional view schematically indicating a configuration of the combustor of the jet engine according to the third embodiment, and indicating the state after the igniter has been activated and at time of keeping the flame.

Hereinafter, with reference to FIG. 12 and FIG. 13, the combustor of the jet engine according to the third embodiment will be explained. FIG. 12 is the schematic cross-sectional view schematically indicating the configuration of the combustor of the jet engine according to the third embodiment, and indicating the state at time of starting the igniter and keeping the flame. FIG. 13 is the schematic cross-sectional view schematically indicating the configuration of the combustor of the jet engine according to the third embodiment, and indicating the state after the igniter has been activated and at time of keeping the flame.

In the third embodiment, for the same components as those of the second embodiment, the same reference numerals are used. The third embodiment is the same as the second embodiment in a point in which the igniter 61 is embedded only in a part of the flame-holding depression 66. On the other hand, a position where the igniter 61 is embedded in the third embodiment is different from that in the second embodiment. In addition, the third embodiment differs from the second embodiment in a point in which a barrier member 68 for covering a part of a surface of the igniter 61 is provided in the third embodiment.

The barrier member 68 is held on the surface of the igniter 61 by an adhesion force between material of the barrier member 68 and material of the igniter 61. Alternatively, it is possible that the barrier member 68 and the surface of the igniter 61 are joined via a joining member such as an adhesive or screws.

In the third embodiment, a part of the surface of the igniter 61 which is not covered with the barrier member 68 constitutes a throat portion 69 from which the flame 71 is emitted. The igniter driver 63 is located adjacent to the throat portion 69.

Subsequently, the operation method of the flying body 1 and the jet engine 2 according to the present embodiment will be explained.

Firstly, the inlet cover 9 is separated from the inlet 6, after the flying body reaches the desired speed. Then, the high speed air flows into the space 50, and the mainstream of the air is formed. Next, the fuel is injected from the fuel injector 62 toward the mainstream of the air, i.e., toward the space 50. The mainstream of the air and the fuel are mixed, and the gas mixture flow is formed. Further, before or after the time of the fuel injection, the activation signal from the igniter controller 64 is transmitted to the igniter driver 63 via the cable 65 or the like. The igniter driver 63 starts the igniter 61. The igniter 61 is activated to emit the flame 71 toward the space 50 or the flame-holding space 67 (a part of the flame holding depression 66 where the igniter 61 has not been installed). The flame 71 is strong because the flame 71 is emitted via the throat portion 69. In addition, in a state immediately after the start of the igniter 61, a part of the flame-holding depression 66 where the igniter has not been installed functions as the flame-holding space 67 for the flame 71. The flame 71 is used to burn the gas mixture of the gas mixture flow or the gas mixture flowing into the flame-holding space 67, and the flame 72 is formed. In addition, the igniter 61 disappears by the activation, and a space after the disappearance is formed. Then, the space after the disappearance in addition to a part of the flame-holding depression 66 where the igniter 61 has not been installed functions as the flame-holding space 67 for the flame 72. The kept flame in the flame-holding space 67 is used to continuously burn the gas mixture of the gas mixture flow. The combustion gas generated by the combustion is discharged from the nozzle 8. By discharging the combustion gas, the flying body 1 obtains thrust and flies. Note that the barrier member 68 held by the igniter 61 leaves the flame-holding depression 66 by the disappearance of the igniter 61, and the barrier member is discharged with the combustion gas from a rearward side of the nozzle 8.

The present embodiment has the same effects as the second embodiment. In addition, the present embodiment has the following effects. Firstly, since the flame generated by the igniter 61 is emitted through the throat portion 69, the flame is strong. That is, since a flame emission portion of the igniter is a narrowed-portion, combustion pressure of the igniter such as the solid rocket motor is increased, a burning rate is increased and the flame is strengthened. Secondly, since it is possible to emit the flame toward the flame-holding space 67 etc. in a concentrated manner, ignition properties for the gas mixture are improved.

Fourth Embodiment

Figure 14:
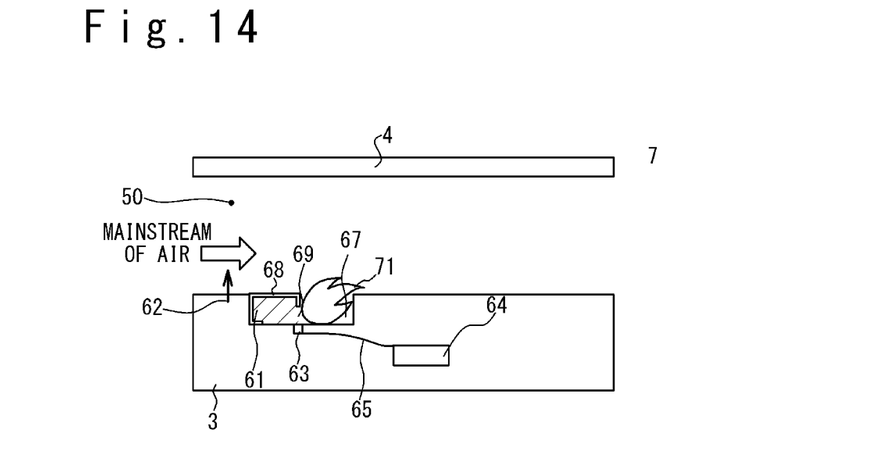
FIG. 14 is a schematic cross-sectional view schematically indicating a configuration of the combustor of the jet engine according to the fourth embodiment, and indicating the state at time of starting the igniter and keeping the flame.

Hereinafter, with reference to FIG. 14, the combustor of the jet engine according to the fourth embodiment will be explained. FIG. 14 is the schematic cross-sectional view schematically indicating the configuration of the combustor of the jet engine according to the fourth embodiment, and indicating the state at time of starting the igniter and keeping the flame.

In the fourth embodiment, for the same components as those of the third embodiment, the same reference numerals are used. The fourth embodiment is the same as the third embodiment in a point in which the barrier member 68 for covering a part of the surface of the igniter 61 is provided. On the other hand, the fourth embodiment differs from the third embodiment in a point in which a part of the barrier member 68 is inserted between the igniter 61 and the wall surface of the combustor 7 and is held between the igniter 61 and the wall surface of the combustor 7 in the fourth embodiment.

The present embodiment has the same effects as the third embodiment. In addition, the present embodiment has the following effect. That is, since a part of the barrier member 68 is inserted between the igniter 61 and the wall surface of the combustor 7, the barrier member 68 is securely held until the igniter 61 disappears.

Fifth Embodiment

Figure 15:
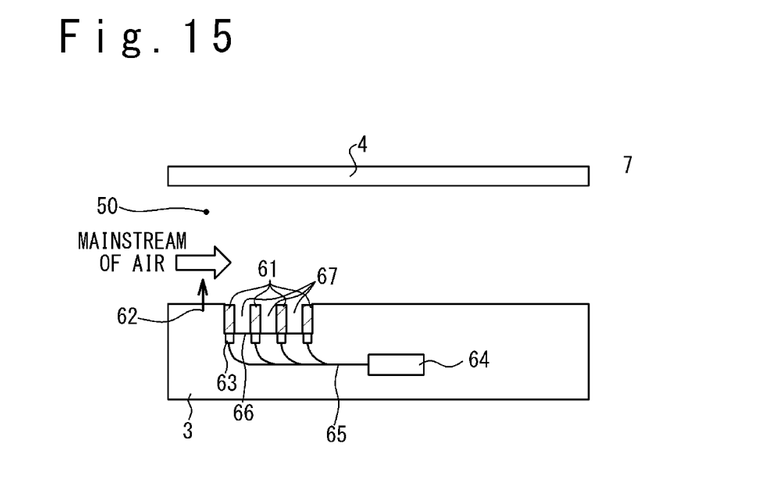
FIG. 15 is a schematic cross-sectional view schematically indicating a configuration of the combustor of the jet engine according to the fifth embodiment.

Hereinafter, with reference to FIG. 15, the combustor of the jet engine according to the fifth embodiment will be explained. FIG. 15 is the schematic cross-sectional view schematically indicating the configuration of the combustor of the jet engine according to the fifth embodiment.

In the fifth embodiment, for the same components as those of the second embodiment, the same reference numerals are used. The fifth embodiment differs from the second embodiment in a point in which a plurality of the igniters 61 is arranged apart from each other in the flame-holding depression 66 in the fifth embodiment.

The present embodiment has the same effects as the second embodiment. In addition, the present embodiment has the following effect. That is, since the plurality of igniters 61 is arranged apart from each other in the flame-holding depression 66, the plurality of igniters 61 simultaneously and extensively burns in the flame-holding depression 66, and the ignition for the gas mixture becomes more reliable.

Note that the above-mentioned embodiments are examples in which the jet engine is applied to the flying body. The flying body includes an aircraft, a rocket, etc.

The present invention is not limited to each of the above-mentioned embodiments. Various modifications can be performed on each of the above-mentioned embodiments without departing from the spirit or scope of the general inventive concept of the present invention. For example, it is possible to activate the igniter 61 without providing the igniter driver 63, the igniter controller 64 and the cable 65 etc. As an example, it is possible that the igniter 61 autoignites and is activated by heat and pressure created by compression of the air which has been taken through the inlet 6 after the inlet cover 9 is separated from the inlet 6. Moreover, in FIG. 4 the inlet cover 9 is described. However, providing the inlet cover 9 is not essential, and it is possible to provide a nozzle cover rearward of the nozzle 8 instead of providing the inlet cover 9. Alternatively, it is possible to simplify the configuration of the jet engine by omitting the inlet cover 9 and the nozzle cover. Further, in each of the above-mentioned embodiments, the solid rocket motor is adopted as the igniter 61. Alternatively, a spark plug, a laser igniter etc. can be adopted as the igniter 61. In this case, the igniter 61 may be provided so as to be separable from the flame holder (the flame-holding depression 66 or the flame-holding step portion 66' or the like). Thus, by separating the igniter 61 after the activation from the flame holder, the space after the separation of the igniter 61 (after the disappearance of the igniter) can be used as the flame-holding space. Note that the separated igniter 61 may be discharged with the combustion gas from the rearward side of the nozzle 8. As a separation mechanism, for example, connection between the igniter 61 and the flame holder may be cut using heat generated by the activation of the igniter 61.

In addition, various techniques used in some embodiments or alternatives can be applicable to other embodiments or alternatives as long as the technical contradiction does not occur. For example, in the first embodiment, it is possible to adopt a configuration of providing the barrier member 68 according to the third embodiment and so on.

The invention claimed is:

1. A combustor in which fuel is to be burned by using air taken through an inlet, the combustor comprising:
   an injector for injecting the fuel;
   a depression portion defined in a wall surface of the combustor downstream of the injector;
   an igniter provided in one part of the depression portion to ignite a gas mixture of the air and the fuel; and
   a first flame-holding space provided in another part of the depression portion to keep a flame ignited by the igniter,
   wherein the igniter is configured to disappear to form a second flame-holding space in the depression portion while the gas mixture of the air and the fuel is combusted, and
   wherein at least a part of a periphery of the igniter is covered with a barrier which is distinct from the wall surface of the combustor, and which is configured to leave the depression portion by the igniter disappearing.

2. The combustor according to claim 1, wherein a maximum length of the depression portion along a direction of a mainstream of the air taken through the inlet is defined as a length L, and a maximum depth of the depression portion is defined as a depth D, and
   wherein the length L and the depth D are set such that L>D is satisfied.

3. The combustor according to claim 1, wherein a part of the barrier is between the igniter and the wall surface of the combustor.

4. The combustor according to claim 1, wherein the igniter is configured to autoignite and be activated due to heat and pressure created by compression of the air which has been taken through the inlet.

5. A jet engine comprising:
   the combustor according to claim 1;
   the inlet disposed forward of the combustor; and
   a nozzle disposed rearward of the combustor.

6. A flying body comprising:
   the jet engine according to claim 5; and
   a thruster installed apart from the jet engine and configured to be activated to give thrust to the flying body before the jet engine is activated.

7. A rocket motor comprising the combustor according to claim 1.

8. The combustor according to claim 1, wherein the barrier is configured to contact the wall surface of the combustor.

9. An operation method of a jet engine, the jet engine comprising:
   an inlet configured to take air;
   a combustor configured to generate combustion gas by burning fuel by using the air; and
   a nozzle configured to eject the combustion gas from a rearward side of the jet engine,
   wherein the combustor comprises:
   an injector for injecting the fuel;
   a depression portion defined in a wall surface of the combustor downstream of the injector; and
   an igniter provided in one part of the depression portion to ignite a gas mixture of the air and the fuel; and
   a first flame-holding space provided in another part of the depression portion to keep a flame ignited by the igniter, wherein at least a part of a periphery of the igniter is covered with a barrier which is distinct from the wall surface of the combustor,
   the operation method comprising:
   taking the air through the inlet;
   igniting the gas mixture of the air and the fuel by using the igniter;
   having the barrier leave the depression portion by the igniter disappearing;
   forming a second flame-holding space in the depression portion while the gas mixture of the air and the fuel is combusted by the igniter disappearing;
   keeping the flame for burning the fuel by using the depression portion after the igniter is activated;
   burning the gas mixture of the air and the fuel by using the flame which is kept; and
   emitting the combustion gas generated by the burning from the nozzle.

* * * * *